(12) United States Patent
Fuchs et al.

(10) Patent No.: US 7,531,093 B2
(45) Date of Patent: May 12, 2009

(54) PROCESS FOR THE AEROBIC-THERMOPHILIC STABILIZATION AND DISINFECTION OF SLUDGE

(76) Inventors: Leonhard Fuchs, Stocktal 2, Mayen (DE) 56272; Martin Fuchs, Stocktal 2, Mayen (DE) 56272

( * ) Notice: Subject to any disclaimer, the term of this patent is extended or adjusted under 35 U.S.C. 154(b) by 0 days.

(21) Appl. No.: 10/581,631

(22) PCT Filed: Apr. 21, 2006

(86) PCT No.: PCT/EP2006/061726

§ 371 (c)(1),
(2), (4) Date: Jan. 3, 2008

(87) PCT Pub. No.: WO2006/111572

PCT Pub. Date: Oct. 26, 2006

(65) Prior Publication Data

US 2008/0210627 A1 Sep. 4, 2008

(30) Foreign Application Priority Data

Apr. 22, 2005 (DE) .................. 10 2005 018 895

(51) Int. Cl.
C02F 3/00 (2006.01)
(52) U.S. Cl. .................. 210/613; 210/620; 210/631
(58) Field of Classification Search ......... 210/612–613, 210/620–626, 631
See application file for complete search history.

(56) References Cited

U.S. PATENT DOCUMENTS

| | | | | |
|---|---|---|---|---|
| 4,975,194 A | * | 12/1990 | Fuchs et al. | 210/604 |
| 4,983,298 A | * | 1/1991 | Fuchs et al. | 210/613 |
| 5,948,261 A | | 9/1999 | Pressley | 210/609 |
| 6,966,983 B1 | * | 11/2005 | McWhirter et al. | 210/150 |
| 2008/0245729 A1 | * | 10/2008 | Fuchs et al. | 210/603 |

FOREIGN PATENT DOCUMENTS

| | | |
|---|---|---|
| DE | 3240009 | 5/1984 |
| EP | 0384162 | 8/1990 |
| GB | 2105318 | 7/1982 |
| JP | 06199586 | 7/1994 |
| JP | 2003171195 | 6/2003 |

OTHER PUBLICATIONS

International Search Report dated Aug. 4, 2006 based on the PCT Application No. PCT/EP2006/061726.
Breitenbücher et al. "*Aerob-Thermophile Stabilisierung von Abwasserschlämmen*", Korrespondenz Abwasser 29$^{th}$ Year, Issue Apr. 1982, pp. 203-207.

* cited by examiner

*Primary Examiner*—Chester T Barry
(74) *Attorney, Agent, or Firm*—Ohlandt, Greeley, Ruggiero & Perle, L.L.P.

(57) ABSTRACT

Disclosed is a method for the aerobic-thermophilic stabilization and decontamination of sludge, in which a) raw sludge having a dry substance concentration of 3 to 7 percent by weight is fed to a first stage and remains there for an average dwell time of four to ten days at minimum temperatures of 42° C. while an oxygen-containing gas is added so as to obtain partially stabilized sludge, b) said partially stabilized sludge is fed to a second stage in which the same is further stabilized and decontaminated for an average dwell time that amounts to 30 to 70 percent of the average dwell time of the first stage at temperatures exceeding 500° C. while adding an oxygen-containing gas.

14 Claims, No Drawings

PROCESS FOR THE AEROBIC-THERMOPHILIC STABILIZATION AND DISINFECTION OF SLUDGE

The invention relates to a process for the stabilization and disinfection of sludge in two steps.

A generic process has been described, for example, in "Korrespondenz Abwasser", 29th year, issue April 1982, pp. 203-207. In this process, the entering raw sludge, after having been gravity-thickened, is aerated with simultaneous intense mixing in two heat-insulated reactors connected in series. In the reactor I, the temperature variation is predominantly around the upper mesophilic range ($30 \leq t < 42°$ C.), whereas in the reactor II thermophilic temperatures ($\geq 42°$ C.) are permanently maintained. With sufficient retention time of each batch in reactor II and maintenance of the temperatures above 50° C., disinfection is achieved. In this plant, a batch of stabilized and disinfected sludge is discharged from reactor II once daily, followed by transferring a corresponding batch from reactor I to reactor II and finally filling reactor I with raw sludge. This operation is required to ensure disinfection in reactor II and has been regular practice to date.

Drawbacks of this process are high variations of temperature, oxygen demand and in some cases pH-value in reactor I and the temporarily occurring odor emissions, since 30 to 50% of the reactor contents are usually replaced by raw sludge at once when the tank is charged. For larger plants with three reactors, these problems can again aggravate.

DE PS 39 05 228 discloses a process for the aerobic stabilization and disinfection of thickened sewage sludge in several steps, using one or more heat-insulated tanks, preferably with stirring, with the addition of oxygen-containing gas. In this process, the entering thickened raw sludge is to be supplied to a stage A which can be aerated and optionally agitated, and heated to temperatures of at least 25° C. From this stage, it is to be transferred batch by batch into a stage B which can be aerated and/or agitated, in which temperatures of above 50° C. are generated essentially by aerobic degradation and wherein the time between two batches is sufficient for disinfection depending on temperature. From this stage, a batch of sludge disinfected in stage B—which corresponds to the batch respectively transferred from stage A to stage B—is to be transferred to a stage C, which can be aerated and/or agitated, in which the temperatures are reduced to the range from 25 to 45° C., preferably about 35° C., by heat exchange. Always, the transferring of the batch is to start with the discharge of the corresponding batch from stage C, to be continued by transferring the corresponding batch from stage B into stage C, to be continued by transferring the corresponding batch from stage A into stage B, followed by charging stage A with raw sludge again. In this process, the average retention time should preferably be about one day in stage A, preferably from 2 to 3 days in stage B, and from 3 to 4 days in stage C.

In practice, it has been found disadvantageous with this process that typically about 100% of the contents of the tank is exchanged once a day in stage A, and from 33 to 50% of the contents of the tank in stage B. This causes heavy variations of temperature and oxygen content in the upstream stages, and temporarily odor emissions, especially in the region of stage A, the temperature of which is always below the thermophilic range.

Therefore, it is the object of the invention to develop a process for the stabilization and disinfection of thickened sludge which overcomes the drawbacks of the prior art.

This object is achieved by a process for the aerobic-thermophilic stabilization and disinfection of sludge wherein a) raw sludge having a dry matter content of from 3 to 7% by weight is fed to a first stage, where said raw sludge remains during an average retention time of from four to ten days at temperatures of at least 42° C. with an introduction of an oxygen-containing gas to obtain a partially stabilized sludge;

b) said partially stabilized sludge is fed to a second stage in which said sludge is further stabilized and disinfected during an average retention time, which is 30 to 70% of the average retention time of the first stage, at temperatures of above 50° C. with the introduction of an oxygen-containing gas.

Thus, according to the invention, the sludge is always kept in the thermophilic range, i.e., at temperatures of at least 42° C., preferably of at least 45° C., in the first stage. With average retention times of from 4 to 10 days, this results in a partial stabilization of the sludge. The stabilization and disinfection are then completed in the second stage, also in the thermophilic range.

A sludge is considered stabilized if it can be stored for an extended period of time or be applied to agricultural land without problems. This condition is typically achieved if the organic content is reduced by about 30 to 50%, preferably more than 40%. The organic content is determined by the loss on ignition of a dried sample according to DIN 38409.

While in the prior art the temperatures in the first tank usually vary about the upper mesophilic range, the process according to the invention takes care that the temperature does not fall below the thermophilic range, i.e., below 42° C., after the feed of the raw sludge. Preferably, the temperatures in this stage are at least 45° C., more preferably at least 48° C.

In the process according to the invention, discharging and charging cycles are run which usually begin with discharging from the second stage. Subsequently, a corresponding batch of partially stabilized sludge is transferred from the first stage to the second stage, and then raw sludge is fed into the first stage.

In usual plants, such a charging cycle is run once a day. Depending on the kind of plant, it may also be possible to perform charges twice a day. Especially, when charging is performed manually, it may happen that there is no charging occasionally, for example, there is often no charging on Sundays and public holidays.

According to the invention, it is preferred that charging takes place on a regular basis, i.e., preferably once daily, because it is only then that from 10 to 25% of the contents is replaced by raw sludge in the first stage. According to the invention, if possible, not more than 30%, preferably less than 25%, should be replaced by raw sludge in the first stage in order to avoid odor emissions.

In a preferred embodiment of the invention, the average retention time in the first stage is from 5 to 6 days. The preferred average retention time in the second stage is from 2.5 to 3 days.

The first and second stages are performed in separate tanks. Either the first tank may be larger than the second tank or for the first stage tanks of the same size as those used in the second stage are employed, but more of them, for example, two tanks for the first stage and one tank for the second stage. By doing so, it is achieved that the average retention time in the second stage is about 50% of the retention time in the first stage. In one embodiment, the retention time in the second stage is clearly shorter than that in the first stage, for example, in a range of from 30 to 40%. In another embodiment, the average retention time in the second stage is within a range of from 60 to 70% of the retention time of the first stage. More preferably, the average retention time in the second stage is within a range of from 40 to 60% of the retention time of the first stage.

In accordance with this application, a tank is any suitable container, including a basin. Such containers are also referred to as reactors.

In the first and second stages, an oxygen-containing gas, such as air, is supplied. As in the prior art plants, the aeration intensity, aeration time and/or oxygen content of the supplied gas is controlled. Typical measured and controlled quantities for the oxygen supply are the batches of raw sludge, the redox potential or oxygen content in the sludge, and the oxygen content or $CO_2$ content of the exhaust gas.

The temperatures of the first and second stages can be controlled by supplying or withdrawing heat. For example, heat exchangers may be employed for this purpose. In a preferred embodiment, the temperature is not above 60° C. in the first stage and not above 65° C. in the second stage. Particularly, suitable temperatures for the second stage are about from 55 to 60° C. Undesirable heat losses can be avoided by a sufficient insulation of the tanks.

The stabilized and disinfected sewage sludge obtainable by this process may subsequently be further treated physically, chemically or biologically. It is highly suitable for land application.

Exhaust gas released from the process may also be recovered and treated physically, chemically and/or biologically.

As the sludge for the process according to the invention, thickened sewage sludges may be used, as obtained from the mechanical or biological treatment of domestic and/or industrial sewage. The thickening may be effected by gravity or mechanically.

The process may also be employed for the stabilization and disinfection of liquid manure, other organic concentrates, for example, from food processing, and food wastes.

According to the invention, the solids content is selected in such a way that, on the one hand, biologically degradable organic matter is sufficiently present, and on the other hand, the rheological properties are still of a nature that the sludge is easy to handle. Especially, for slightly higher solids contents of the raw sludge, for example, about from 4 to 5%, it is usually not required to heat stage A because the thermophilic temperatures are reached autothermally.

The invention claimed is:

1. A process for the aerobic-thermophilic stabilization and disinfection of sludge, wherein:
   a) raw sludge having a dry matter content of from 3 to 7% by weight is fed to a first stage, where said raw sludge remains during an average retention time of from four to ten days at temperatures of at least 42° C. with the introduction of an oxygen-containing gas to obtain a partially stabilized sludge;
   b) said partially stabilized sludge is fed to a second stage in which said partially stabilized sludge is further stabilized and disinfected during an average retention time which is 30 to 70% of the average retention time of the first stage at temperatures of above 50° C. with the introduction of an oxygen-containing gas.

2. The process according to claim 1, wherein the average retention time in the first stage is from five to six days.

3. The process according to claim 1, wherein the average retention time in the second stage is from 2.5 to three days.

4. The process according to claim 1, wherein the first and second stages are performed in separate tanks.

5. The process according to claim 4, wherein the number of tanks for the first stage is higher than the number of tanks of the second stage.

6. The process according to claim 1, wherein air is supplied as said oxygen-containing gas in the stages, wherein the aeration intensity and/or aeration time of the supplied gas are controlled.

7. The process according to claim 6, wherein the amount of raw sludge, the redox potential or oxygen content in the sludge and the oxygen content or $CO_2$ content of the exhaust gas are employed as measured and controlled quantities for the oxygen supply.

8. The process according to claim 1, wherein the temperature in the first and second stages is controlled by supplying or withdrawing heat.

9. The process according to claim 1, wherein the temperature in the first stage does not exceed 60° C.

10. The process according to claim 1, wherein the temperature in the second stage does not exceed 65° C.

11. The process according to claim 1, wherein the temperature in the second stage is within a range of from 55 to 60° C.

12. The process according to claim 1, wherein the temperature in the first stage is at least 45° C.

13. The process according to claim 1, wherein the stabilized and disinfected sludge is subsequently further treated physically, chemically and/or biologically.

14. The process according to claim 1, wherein exhaust gas released from the process is recovered and treated physically, chemically and/or biologically.

* * * * *

UNITED STATES PATENT AND TRADEMARK OFFICE
CERTIFICATE OF CORRECTION

| | | |
|---|---|---|
| PATENT NO. | : 7,531,093 B2 | Page 1 of 1 |
| APPLICATION NO. | : 10/581631 | |
| DATED | : May 12, 2009 | |
| INVENTOR(S) | : Fuchs et al. | |

It is certified that error appears in the above-identified patent and that said Letters Patent is hereby corrected as shown below:

On the title page item (57), In the abstract, change "500 °C" to "50 °C"

On the title page item (76), Change postal code of the above-identified inventors from "56272" to "56727"

Signed and Sealed this

Fifth Day of January, 2010

David J. Kappos
*Director of the United States Patent and Trademark Office*